United States Patent [19]
Ohsaki et al.

[11] Patent Number: 5,520,480
[45] Date of Patent: May 28, 1996

[54] METHODS FOR LAYING ROADS

[75] Inventors: Hiromi Ohsaki; Kenichi Itoh; Takao Oshima, all of Kubiki-mura, Japan

[73] Assignee: Shin-Etsu Chemical Co., Ltd., Tokyo, Japan

[21] Appl. No.: 395,799

[22] Filed: Feb. 28, 1995

[30] Foreign Application Priority Data

Feb. 28, 1994 [JP] Japan ................. 6-054622

[51] Int. Cl.$^6$ ................. E01C 7/32; E01C 7/34
[52] U.S. Cl. ................. 404/75; 404/82; 106/2; 106/287.14; 106/287.16
[58] Field of Search ................. 404/27, 28, 32, 404/33, 44, 46, 75, 82; 106/2, 287.14, 287.16; 427/215, 220, 384, 387

[56] References Cited

U.S. PATENT DOCUMENTS

| | | | |
|---|---|---|---|
| 3,577,893 | 5/1971 | Towner | 404/32 |
| 4,027,428 | 6/1977 | Hillel | 404/91 X |
| 4,648,904 | 3/1977 | DePasquale et al. | 106/2 |
| 5,073,195 | 12/1991 | Cuthbert et al. | 106/2 |
| 5,183,710 | 2/1993 | Gerbino | 427/220 |
| 5,413,808 | 5/1995 | Wyner | 427/140 |

*Primary Examiner*—George A. Suchfield
*Attorney, Agent, or Firm*—Townsend & Banta

[57] ABSTRACT

A method of laying a road characterized by spraying and impregnating a roadbed with 1 g/m$^2$ to 500 g/m$^2$ of a liquid water-repellent agent and then laying a road on said roadbed wherein said liquid water repellent agent is fluid at ordinary temperatures and contains as the main ingredients one or more compounds chosen from among silane-type compounds and organopolysiloxane derivatives.

4 Claims, 1 Drawing Sheet

METHODS FOR LAYING ROADS

BACKGROUND OF THE INVENTION

1. Field of the Invention

This invention relates to a method of laying a road, and more precisely to a method of laying a road characterized by the use of a specific water repellent agent to reduce the road damage due to a frozen roadbed.

2. The Prior Art

A frozen roadbed is a natural phenomenon generally observed in winter and/or in cold regions. In general, when the temperature of the roadbed drops below 0° C., the roadbed freezes because water in the roadbed forms ice or because water which has risen from the roadbed to the earth surface via the capillary phenomenon forms ice.

As described above, the extent of the occurrence of frozen roadbeds and frost columns is affected by the conditions of the ground foundation which contains the water and also by weather conditions. An example of roadbeds which tend to cause freezing and frost columns is a clay or silt layer with a smaller particle size which has a large amount of water retained in the roadbed (suspending water) and also has a strong capillary attraction.

When a roadbed freezes, since water in the roadbed freezes to form an ice layer(s), its volume expands and the roadbed swells to lift up the road surface or the roadbed surface expands to cause unevenness.

When only the water existing in the roadbed freezes, the volume expansion is about 9% and lift-up of the road surface is limited. However, if water is supplied to the roadbed from underground water via the capillary phenomenon, then the ice layer grows to create a larger expansion force, thus causing greater road damage due to the lift-up of the road surface and/or expansion of the roadbed surface.

In particular for paved roads whose roadbeds are paved with concrete, asphalt and such, serious damage to the road surface, such as peeling and cracking of the paved surface, will occur. Also, if a roadbed is kept frozen for a long time after the ice near the earth surface on the frozen roadbed has thawed, then water from melted ice, rain and such does not penetrate into the earth and stays on the road surface, sometimes causing bad road conditions.

Furthermore, when spring comes and melts the ice, increasing the water content in the roadbed, the roadbed may become soft and weak, and lose the strength necessary to support the road surface, thus causing road breakage due to the traffic load.

Conventionally, the following methods have been adopted to prevent freezing in roadbeds:

(1) Lowering the underground water level
(2) Raising the road surface
(3) Blocking capillary water by establishing a layer(s) consisting of a low capillary-rise material(s) such as a sand layer, a gravel layer, a crushed stone layer or a mixture of these, or a non-water-permeable layer(s) such as asphalt paper or an asphalt-tar layer at an adequate depth in the roadbed
(4) Replacing the soil in the roadbed with a material which does not freeze easily, such as gravel, crushed stone or sand
(5) Providing a thermal insulation layer(s) near the road surface.

However, the conventional methods such as those described above have not been sufficiently effective countermeasures against frozen roadbeds. That is, methods such as lowering the underground water level or raising the earth surface level are not necessarily easy solutions. For example, in order to lower the underground water level, it is necessary to provide drain pipes, blind ditches, etc., and there are problems in that the construction period is very long and costs are very high.

Also, it is impossible to completely prevent freezing of the roadbed solely by a layer consisting of a low capillary-rise material(s) such as a sand layer, a gravel layer or a crushed stone layer, and the sand layer has to be particularly thick to have a significant effect.

Also, a non-water-permeable layer has the shortcomings of poor water drainage because water on the road surface is not absorbed into the roadbed, thus causing soft and weak road surfaces. Also, methods such as replacing the roadbed with a material(s) which does not freeze easily, or providing a thermal insulation layer(s) near the road surface lead to high costs, and are not necessarily realistic solutions for roads in general.

BRIEF SUMMARY OF THE INVENTION

An object of this invention is to efficiently prevent the freezing of roads, particularly paved roads.

Another object of this invention is to prevent various kinds of damage to roads due to the freezing.

This invention provides a method of laying roads which makes it possible to achieve such objectives.

The inventors have been earnestly conducting a study to prevent frozen roadbeds from the above described viewpoints, and were surprised to discover that the freezing of the roadbeds could be efficiently prevented by establishing a hydrophobic soil layer(s) by spraying and impregnating the roadbed with a specific water-repellent agent and thus completed this invention.

This invention provides a method of laying a road characterized by spraying and impregnating a roadbed with 1 g/m$^2$ to 500 g/m$^2$ of a liquid water-repellent agent and then laying a road on said roadbed wherein said liquid water repellent agent is fluid at ordinary temperatures and contains as its main ingredients one or more compounds chosen from among silane-type compounds and organopolysiloxane derivatives.

This invention also provides a method of laying a road as described above wherein said silane-type compound is an alkoxysilane derivative represented by the general formula (A)

$$R^1{}_n Si(OR_2)_{4-n} \tag{A}$$

(where $R^1$ denotes an alkyl, alkenyl or aryl group with a carbon number of 1–20 or a derivative of these, and the $R^1$'s in one molecule can be either all the same or different; $R^2$ denotes an alkyl group with a carbon number of 1–4; and n denotes a natural number 1–3) and/or a chlorosilane derivative represented by the general formula (B)

$$R^1 SiCl_{4-n} \tag{B}$$

(where R denotes an alkyl, alkenyl or aryl group with a carbon number of 1–20 or a derivative of these, and the $R^1$'s in one molecule can be either all the same or different).

This invention also provides a method of laying a road as described above wherein said organopolysiloxane derivative is an organopolysiloxane derivative represented by the general formula (C)

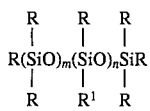 (C)

(where R denotes an alkyl group with a carbon number of 1–20, and the R's in one molecule can be either all the same or different; $R^1$ denotes a group chosen from a monovalent hydrocarbon group with a substitutional group(s), polyoxyalkylene group, aryl group or alkyl group with a carbon number of 2 or more; m and n denote 0 or positive integers), but m and n are not both 0, or an organopolysiloxane represented by formula (D)

 (D)

($R^1$ denotes an alkyl group with a carbon number of 1–20; $R^2$ denotes an atom or a group chosen from among –H, OH and $-OR^3$ ($R^3$ denotes a monovalent hydrocarbon group with a carbon number of 1–3); M denotes an alkali metal or an alkali earth metal; a is in the range of 0<a<3, b is in the range of 0≦b≦3, and c is in the range of 0≦c≦3 where a+b+c is in the range of 0<a+b+c<3).

According to the present invention, the organopolysiloxane of formula C may be used in combination with the alkoxysilane of formula A or the chlorosilane of formula B.

DETAILED DESCRIPTION

This invention will be described in detail below. The methods of laying roads and such of this invention prevent frozen roads by providing a hydrophobic layer(s) consisting of a specific water-repellent agent not on the so-called road surface of the roadbed, but inside the earth layers which constitute the roadbed. They are fundamentally different in terms of the location to which they are applied and their target applications from conventional soil improvement agents which are primarily used on the earth surface. Also, they are not like conventional soil improvement agents which are composites with other components, but are methods of laying roads characterized by the use of a simpler method to provide a substantially hydrophobic layer(s) consisting of a specific water-repellent agent in the roadbed.

The hydrophobic soil layer of this invention is obtained by spraying a specific water-repellent agent on a sand or soil layer. For the water-repellent agent used in this invention, a water repellent agent containing as the main ingredients one or more compounds, chosen from among silane-type compounds and organopolysiloxane derivatives is the most preferable for best performance.

What is used for the silane compound is an alkoxysilane derivative represented by the general formula (A)

$R^1{}_n Si(OR_2)_{4-n}$ (A)

(where $R^1$ denotes an alkyl, alkenyl or aryl group with a carbon number of 1–20 or a derivative of these, and the $R^1$'s in one molecule can be either all the same or different; $R^2$ denotes an alkyl group with a carbon number of 1–4; and n denotes a natural number 1–3) and/or the general formula (B)

$R^1{}_n SiCl_{4-n}$ (B)

(where $R^1$ denotes an alkyl, alkenyl or aryl group with a carbon number of 1–20 or a derivative of these, and the $R^1$'s in one molecule can be either all the same or different).

Specific examples follow:

$C_6H_{13}Si(OCH_3)_3$
$C_6H_{13}Si(OC_2H_5)_3$
$C_{10}H_{21}Si(OCH_3)_3$
$C_{10}H_{21}Si(OC_2H_5)_3$

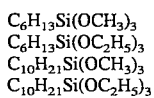

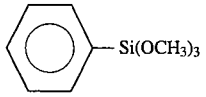

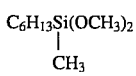

$CH_2=CHSi(OCH_3)_3$
$NH_2C_2H_4NHC_3H_6Si(OCH_3)_3$

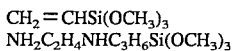

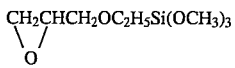

$C_4H_9SiCl_3$
$C_6H_{13}SiCl_3$
$C_8H_{17}SiCl_3$
$C_{10}H_{21}SiCl_3$
$C_6H_5SiCl_3$
$CH_2=CHSiCl_3$
$CH_2=CH(CH_3)COOC_3H_8SiCl_3$
$CF_3(CH_2)_2SiCl_3$

What is used for the organopolysiloxane derivative is an organopolysiloxane derivative represented by the general formula (C)

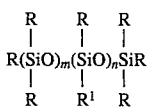 (C)

(where R denotes an alkyl group with a carbon number of 1–20, and the R's in one molecule can be either all the same or different; $R^1$ denotes a group chosen from among a monovalent hydrocarbon group with a substitutional group(s), polyoxyalkylene group, aryl group or alkyl group with a carbon number of 2 or more; m and n denote 0 or positive integers), but m and n are not both 0, or the general formula (D)

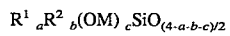 (D)

($R^1$ denotes an alkyl group with a carbon number of 1–20; $R^2$ denotes an atom or a group chosen from among —H, OH and $-OR^3$ ($R^3$ denotes a monovalent hydrocarbon group with a carbon number of 1–3); M denotes an alkali metal or an alkali earth metal; a is in the range of 0<a<3, b is in the range of 0≦b≦3, and c is in the range of 0≦c≦3 where a+b+c is in the range of 0<a+b+c<3).

Examples of $R^1$ in the general formula (C) follow:

$-CH_3$
$-C_8H_{17}$

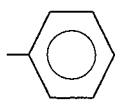

-continued

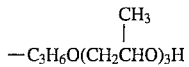

Examples of such polysiloxane derivatives follow:

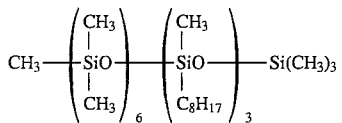

Nonadecamethyl trioctyldecasiloxane

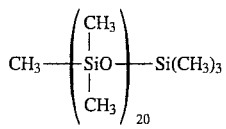

Tetratetracontamethylhenicosasiloxane

Specific examples of the general formula. (D) follow:

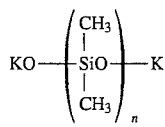

(Rational formula $(CH_3)_2(KO)_{2/n}SiO_{(n-1)/n}$)

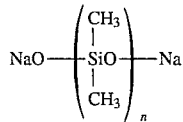

(Rational formula $(CH_3)_2(NaO)_{2/n}SiO_{(n-1)/n}$)

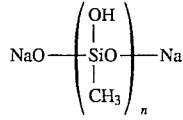

(Rational formula $(CH_3)(OH)(NaO)_{2/n}SiO_{(n-1)/n}$)

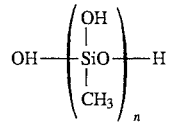

(Rational formula $(CH_3)(OH)_{(n-2)/n}Si_{(n-1)/n}$)

These can either be used independently, diluted with a solvent or water, or mixed with an emulsifier and such and sprayed in an emulsified form.

The amount of the water-repellent agent to be sprayed is preferably in the range between 1 g/m² to 500 g/m² of the main ingredient of the water-repellent agent, i.e. the silane compound or the organopolysiloxane derivative. If the amount sprayed is more than 500 g/m², then the effect is not different from that with a lesser amount, resulting in wasteful use. If the amount is less than 1 g/m², then the effect is not sufficient.

The position and thickness of the layer sprayed with the water-repellent agent are determined by considering weather conditions, characteristics of the roadbed, the position of the underground water level, etc., so that this invention will be effective. For example, if the water-repellent agent is sprayed at a level below the underground water level, then water pressure works on the layer and water will rise in the roadbed. Whereas if the water-repellent agent is sprayed in the roadbed too close to the road surface, then the wet layer below the hydrophobic layer will freeze in extremely cold weather, and the objective of this invention will not be accomplished.

In this invention it is also possible to prevent freezing of the roadbed by combining in the roadbed a sand or gravel layer(s) which retains little water and does not cause too much damage even if freezing occurs.

When pre-reinforcing the roadbed using the cement grouting method or the lime milk grouting method in places such as prairies where the earth layers are clay or silt and therefore sand and gravel are hard to obtain, this invention can prevent frozen roadbeds by combining the spraying of the water-repellent agent in the reinforcing method.

Also this invention is particularly useful when it is applied in a roadbed of a paved road which is covered with concrete or asphalt pavement, because fatal damage to the paved road, including swelling, cracking and fissures due to the freezing of the concrete or asphalt roadbed can be effectively prevented.

This invention is particularly useful when used in a roadbed of a paved road such as a freeway. Because it is possible to simultaneously prevent freezing of the surfaces of the paved roads as well as freeze-damage to the paved roads themselves, automobile skidding accidents can be prevented and it will not be necessary, even in cold regions, to spray on a massive amount of antifreezing agents each time freezing occurs.

As described thus far, the idea of preventing frozen roads and thus eliminating damage to roads due to freezing by artificially establishing a hydrophobic plane on the paved surface and in the roadbed is a new and very useful idea. In particular, this idea gives a solution to the problem of the prevention of frozen roads which has long been awaited in cold regions.

The method of laying roads of this invention provides roads for which freezing of the roadbeds is prevented, and thus road damage due to the lifting up of the road surface and swelling of the surface of the roadbed can be prevented. In particular for paved roads whose roadbeds are paved with concrete or asphalt, serious damage to the road surface such as peeling or cracking of the paved surface can be prevented.

Also, this invention allows construction of anti-freeze roads with a very simple process and at low cost. When this invention is combined with conventional methods of preventing freezing, the thickness of the gravel layer with a low capillary height can be made thinner, for example, and thus the construction costs and the construction period can be reduced.

EXAMPLE

This invention will be described by referring to examples. This invention is not limited to those examples.

Examples 1–7

For each of the Examples 1–7, Shinano river sand was put into a 10 cm diameter container to have a sand layer with a thickness of 10 cm, then a water-repellent agent of Examples 1–7 listed in Table 1, the amount of which is also listed in Table 1, was sprayed on the surface of said sand layer, and finally a silt loam layer containing 5% water was laid on top to have a 10 cm thickness to obtain a soil body, and then the bottom of the lowest sand layer was soaked in water. After letting it stand for a full day at 20° C., the container was taken out of the water and an indoor freezing test was conducted for 72 hours at −10° C. As a result, the top silt loam layer of Examples 1–7 did not freeze at all.

Testing was conducted in the same manner as for said examples except that the water-repellent agent was not sprayed at all (Comparative Example 1) or the sprayed amount was 0.5 g/m² which is less than the range specified in this invention. As a result, the silt loam layer of Comparative Examples 1 and 2 completely froze.

TABLE 1

|  | Water-repellent agent | Amount sprayed | Test result |
|---|---|---|---|
| Examples |  |  |  |
| 1 | Decyltrimethoxysilane | 10 g/m² | No freezing |
| 2 | Decyltrimethoxysilane | 100 g/m² | No freezing |
| 3 | Decyltrichlorosilane | 10 g/m² | No freezing |
| 4 | Nonadecamethyltrioctyldecasiloxane | 10 g/m² | No freezing |
| 5 | 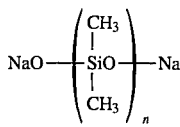 | 10 g/m² | No freezing |
| 6 | "KC89" (Product from Shin-Etsu Chemical Co., Ltd.) | 10 g/m² | No freezing |
| 7 | "POLON MF40" (Product from Shin-Etsu Chemical Co., Ltd.) | 10 g/m² | No freezing |
| Comparative Examples |  |  |  |
| 1 | Decyltrimethoxysilane | Not sprayed | Freezing observed |
| 2 | Decyltrimethoxysilane | 0.5 g/m² | Freezing observed |

Example 8

100 g of decyltrialkoxysilane was sprayed onto a 1 m² (1 m×1 m) area 15 cm deep from the surface of a road whose roadbed was a silt layer which was easy to freeze and thus a hydrophobic layer was formed. The underground water level was set at the bottom of the hydrophobic layer. This sample was then let stand at 10° C. for 48 hours and then the temperature was lowered to −2° C. As a result, no lifting-up of the road surface was observed after 24 hours or after 48 hours.

Example 9

Figure 1:
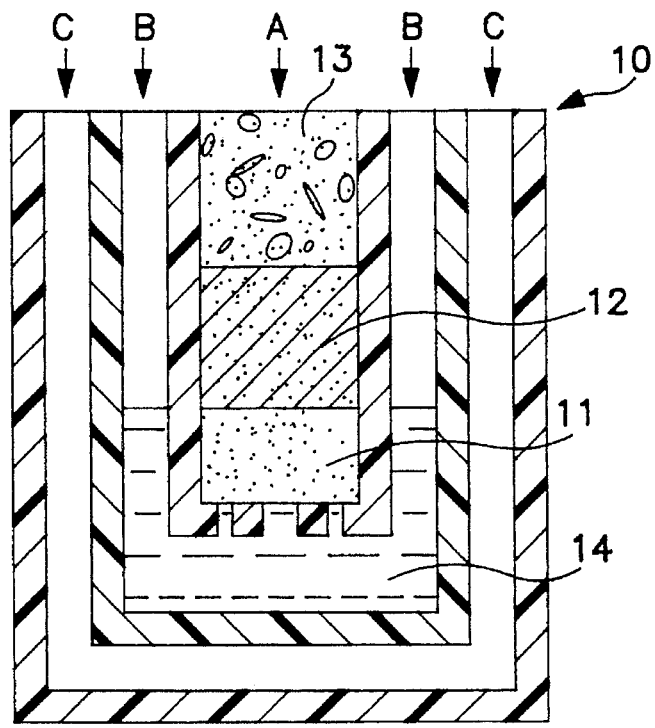
FIG. 1 shows a freeze test of an artificial roadbed using the freeze tester in Example 9.

By using the 3-layer glass freeze tester shown in FIG. 1, lift-up of the road surface due to freezing was tested. In FIG. 1, the freeze tester 10 has, in order from inner to outer, a 20 cm diameter inner layer A, an intermediate layer B which is communicated with the bottom of the inner layer A, and a vacuum layer C.

In this inner layer A, Shinano river sand (average particle size 1.5 mm) used in Example 1 was laid to have a 15 cm thickness from the bottom to form a sand layer 11, and then the water-repellent agent decyltrialkoxysilane used in Example 1 was sprayed such that he amount would be 10 g/m². On top of that, silt soil was laid to form a 20 cm thick silt layer 12, and finally gravel was laid to form a 20 cm thick gravel layer 13 and thus an artificial roadbed was obtained.

Next, water was put into the intermediate layer B up to the same level as the height of the boundary between the sand layer 11 and the silt layer 12. The outer layer C was then depressurized to a vacuum. The temperature of the thermally insulated water layer 14 was kept at 10° C., and the upper portion of the freeze tester 10 was kept at −5° C. to freeze for 48 hours. As a result, the road surface on the gravel layer 13 did not lift and no change was observed.

Comparative Example 3

Testing was conducted in the same manner as for Example 9, except that the water-repellent agent was not sprayed. As a result, after 24 hours, the gravel on the upper portion of the gravel layer 13 had lifted by an average of 2 cm.

Example 10

Figure 2:
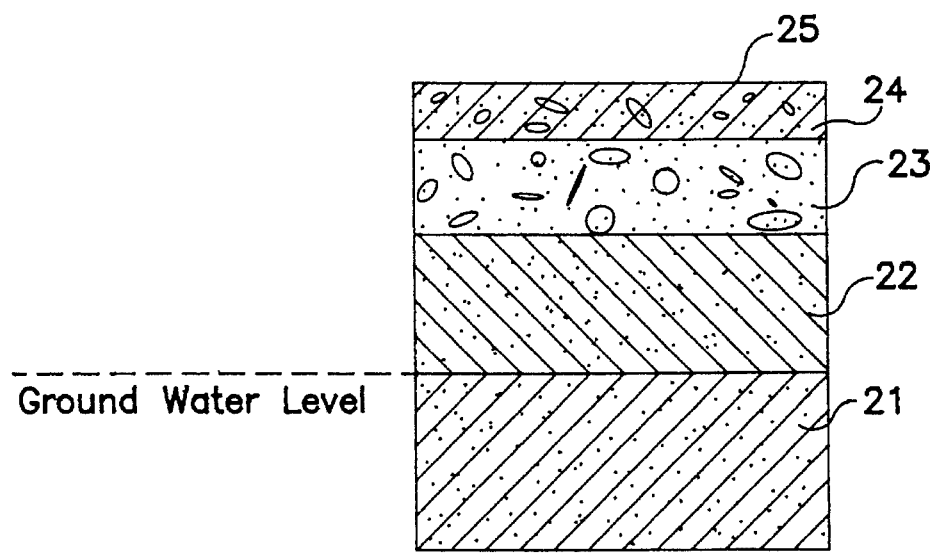
FIG. 2 shows an artificial roadbed of Example 10.

As shown in FIG. 2, the same decyltrialkoxysilane used in Example 1 was sprayed such that the amount would be 10 g/m² at the same level as the underground water level of the ground foundation consisting of the silt layer 21 to establish a water-repellent layer. The silt layer 22 was then laid to have a 20 cm thickness, and on top of that the gravel layer 23 was laid to have a 15 cm thickness, and finally a 5 cm thick asphalt layer 24 was laid to form a roadbed of a paved road whose surface was a road surface 25. This was kept in a low temperature tank at −10° C. for 2 days. As a result, no change was observed on the road surface 25.

Comparative Example 4

A test was conducted in the same manner as Example 10 except for the fact that the water-repellent agent was not sprayed. As a result, the road surface 25 became uneven and fissures developed in parts of the surface.

I claim:

1. A method of laying a road characterized by spraying and impregnating a roadbed with 1 g/m² to 500 g/m² of a liquid water-repellent agent and then laying a road on said roadbed wherein said liquid water repellent agent is liquid at ambient temperatures and contains as its main ingredients one or more compounds selected from the group consisting of silane-type compounds and organopolysiloxane derivatives.

2. The method of laying a road of claim 1, wherein said water-repellant agent is an alkoxysilane derivative represented by formula (A)

$$R^1{}_n Si(OR^2)_{4-n} \qquad (A)$$

where $R^1$ denotes an alkyl, alkenyl or aryl group with a carbon number of 1–20 or a derivative of these, and the $R^1$'s in one molecule can be either all the same or different; $R^2$ denotes an alkyl group with a carbon number of 1–4; and n denotes a number 1–3, or a chlorosilane derivative represented by formula (B)

$$R^1{}_n SiCl_{4-n} \qquad (B)$$

wherein $R^1$ denotes an alkyl, alkenyl or aryl group with a carbon number of 1–20 or a derivative of these, and the $R^1$'s in one molecule can be either all of the same or different.

3. The method of laying a road of claim 1 wherein water-repellant agent is represented by formula (C)

$$R(SiO)_m(SiO)_n SiR \begin{smallmatrix} R & R & R \\ | & | & | \\ & | & \\ R & R^1 & R \end{smallmatrix}$$  (C)

where R denotes an alkyl group with a carbon number of 1–20, and the R's in one molecule can be either all the same or different; $R^1$ denotes a monovalent hydrocarbon group with a substitutional group(s), polyoxyalkylene group, aryl group or alkyl group with a carbon number of 2 or more; m and n denote O or positive integers, but m and n are not both O, or by formula (D)

$$R^1{}_a R^2{}_b (OM)_c SiO_{(4-a-b-c)/2}$$  (D)

wherein $R^1$ denotes an alkyl group with a carbon number of 1–20; $R^2$ denotes —H, —OH or —$OR^3$; $R^3$ denotes a monovalent hydrocarbon group with a carbon number of 1–3; M denotes an alkali metal or an alkali earth metal; a is in the range of O<a<3, b is in the range of 0≦b≦3, and c is in the range of O≦c≦3 where a+b+c is in the range of O<a+b+c<3.

4. The method of laying a road of claim 2, wherein the water repellant agent is represented by formula (C)

$$R(SiO)_m(SiO)_n SiR \begin{smallmatrix} R & R & R \\ | & | & | \\ & | & \\ R & R^1 & R \end{smallmatrix}$$  (C)

where R denotes an alkyl group with a carbon number of 1–20, and the R's in one molecule can be either all the same or different; $R^1$ denotes a monovalent hydrocarbon group with a substitutional group(s), polyoxyalkylene group, aryl group or alkyl group with a carbon number of 2 or more; m and n denote O or positive integers, but m and n are not both O, or by formula (D)

$$R^1{}_a R^2{}_b (OM)_c SiO_{(4-a-b-c)/2}$$  (D)

wherein $R^1$ denotes an alkyl group with a carbon number of 1–20; $R^2$ denotes —H, —OH and —$OR^3$; $R^3$ denotes a monovalent hydrocarbon group with a carbon number of 1–3; M denotes an alkali metal or an alkali earth metal; a is in the range of O<a<3, b is in the range of 0≦b≦3, and c is in the range of O ≦c≦3 where a+b+c is in the range of O<a+b+c<3.

* * * * *